United States Patent Office 3,325,072
Patented June 13, 1967

3,325,072
AUTOMATIC APPARATUS FOR SENSING AND LATERALLY CENTERING TIRE FABRIC FEED OF VARYING WIDTH
Sheppard A. Black, Wayne, and John D. Heide, Ramsey, N.J., assignors to Uniroyal, Inc., a corporation of New Jersey
Original application Dec. 4, 1962, Ser. No. 242,116. Divided and this application Mar. 7, 1966, Ser. No. 532,306
4 Claims. (Cl. 226—20)

This application is a division of our copending application Ser. No. 242,116, filed Dec. 4, 1962, and entitled, "Automatic Machine and Method."

This invention relates to apparatus for making tire carcasses and, more particularly, to apparatus operative as an automatically controlled system for making tire carcasses continuously.

Prior machines have been proposed for making tire carcasses, but those machines are not capable of making the carcasses automatically. Further, such prior machines are not capable of production of tires at high rates. Further, such prior machines have limitations af accuracy with resulting non-uniformity of tires manufactured.

It is an object of the present invention, therefore, to provide a new and improved apparatus for making tire carcasses which avoids one or more of the abovementioned disadvantages of prior such apparatus.

It is another object of the invention to provide a new improved apparatus for making tire carcasses which operate automatically.

It is another object of the invention to provide a new and improved apparatus for making tire carcasses at a high production rate of, for example, 480 tires per hour.

It is another object of the invention to provide a new and improved apparatus for making tire carcasses automatically which provides a high degree of uniformity of the tires manufactured thereby.

In accordance with a particular form of the invention, in an apparatus for continuously sensing whether a continuous sheet of fabric of varying width moving therethrough is centered about a predetermined point in the apparatus, the combination comprises a light-reflecting roller, positioned perpendicular to the path of travel of the fabric, over which the fabric may be passed. The combination also includes two spaced mounting means each displaceable along the direction of the axis of the roller. Each of the mounting means is provided with a pair of light-sensitive devices so mounted thereon as to be sensitive, respectively, to light reflected from a pair of closely spaced reflection points on the roller. Each of the pairs of reflection points is spaced in the direction of the axis of the roller and the pairs of reflection points are equidistant from a predetermined longitudinal point of the roller. The combination also includes means responsive to light reflected to the light-sensitive devices for driving the mounted means simultaneously in opposite directions with respect to the axis of the roller so that the pairs of reflection points may always remain equidistant from the predetermined longitudinal point of the roller.

For a better understanding of the present invention, together with other and further objects thereof, reference is made to the following description, taken in connection with the accompanying drawings, and its scope will be pointed out in the appended claims.

Referring to the drawings.

Figure 1:
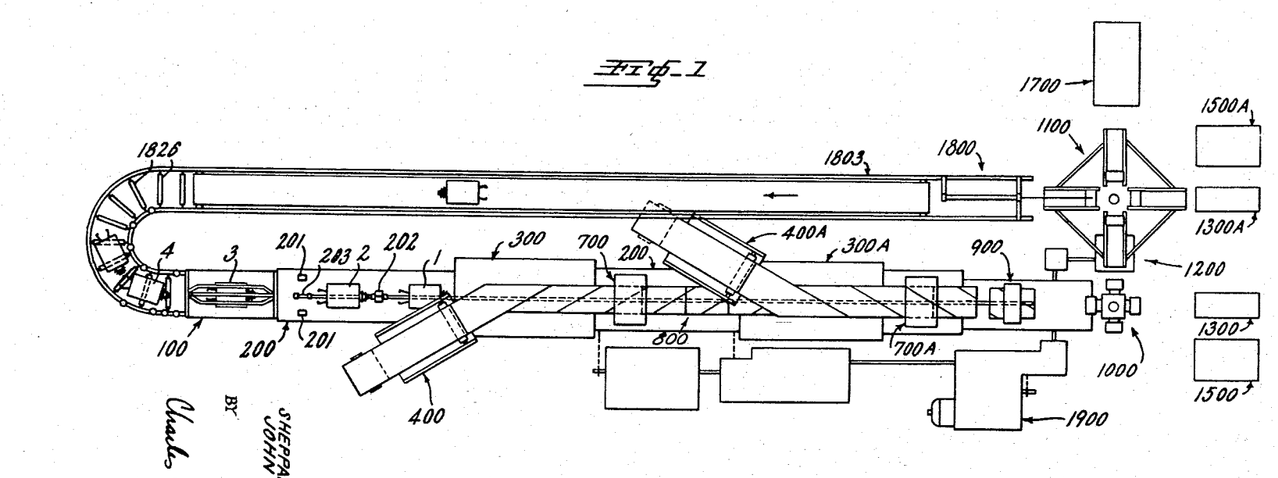
FIG. 1 is a plan view, partly schematic, of apparatus constructed in accordance with the invention.

*General description and explanation of operation of FIG. 1 apparatus*

Referring now more particularly to FIG. 1 of the drawings, the apparatus continuously handles, for example, fifty drums, including drums 1–4. As will be described more fully subsequently, each drum preferably is a rigid metal cylinder with a hollow central region, having a grooved cone attached to one end of the drum and a cam-actuated set of locking fingers attached to the other end of the drum. A pair of annular bands are slidably mounted at the ends of each drum for supporting fabric between drums, as will be apparent subsequently.

The first unit of the apparatus is a band-positioning apparatus 100 for extending the retractable bands of the drums. To this end, a pair of displaceable arms having fingers grip the bands while each drum is in the band-positioning apparatus.

The second unit is a drum loader 200 successively moving the drums into a line of interconnected drums. The drum loader moves the drums along an elongated cam 203 which extends through the machine. The drum loader 200 has an electrically interlocking set of two piston-operated clamps 201, 202 which holds the cam 203 rigidly, in cooperation with the drums, as will be more fully explained subsequently. The clamps 201, 202 open and close alternately so that each drum can be moved onto the cam in a series of three steps. When a drum is first introduced into the drum loader 200, the first set of clamps 201 automatically opens. The drum is then pushed between clamps 201 and 202, the clamps 201 close on the cam, and the clamps 202 open. The drum is then pushed forward so that each drum locks with the drum ahead or downstream by means of the locking cone and fingers which select a groove of the cone. The locking of the drums is controlled by the position of the drums along the cam 203 which has a stepped diameter along its length to actuate the fingers.

The interlocked drums are then driven through a winding frame 300 having a series of driving wheels located in line at the bottom of the drums and on each side of the drums. These wheels are rotatable to drive the drum forward and are mounted in swivels so that they can be adjusted in angle to impart the correct rotating and longitudinally advancing motion to the drums. Fabric is applied to the interlocked set of drums from a let-off frame 400 mounted on one side of the unit 300 and adjusted to cause the fabric to wind onto the drums at a predetermined cord angle.

As the drums advance through the winding frame they move to a fabric cutting unit 700. The fabric cutting unit includes a high speed rotary knife so mounted on a frame as to permit it to be revolved circumferentially around the drums. The knife is mounted so that on signal it cuts the fabric circumferentially between the drums. The cutting unit is mounted on a carriage synchronized with the speed of the longitudinal advance of the drums, and a signal is supplied to the cutting unit by means of an electrical contact made by the drum moving over a contact ring on the cam to cause the fabric cut to be made exactly between two adjacent drums.

After the fabric is cut, the drum advances over a portion of the cam which opens the locking fingers and frees the drum from the following drum. A transfer unit 800 of rollers then advances the drum to lock it automatically on the preceding drum which is rotating and moving longitudinally into a second winding frame 300A. The transfer unit 800 permits the drum to rotate freely about its longitudinal axis. The cam 203 in this portion of the apparatus has a diameter causing the fingers of the preceding rotating drum to interconnect with a different groove on the cone of the drum on the transfer unit. Accordingly, the drum is automatically locked onto the preceding drum with a new and different distance between drums. The drums are then advanced through the second winding unit 300A which is similar to the winding unit 300 and is supplied with fabric from a let-off unit 400A similar to the unit 400. The units 300A and 400A preferably are of opposite hand to the units 300 and 400 to permit crossing fabric plies. Thereafter, the second ply is cut by a cutting unit 700A similar to the cutting unit 700.

The drums are then moved to a turret loader 900 for loading a swivel turret 1000 which grips each drum by means of a pneumatic chuck. The drum is then swung by the turret 1000 to a bead setter 1300 supplied with bead wires by a bead servicer 1500. The bead setter 1300 automatically positions a wire bead over the carcass plies. A set of cam-operated fingers simultaneously moves under the fabric and then grips the bead wire while a pneumatically inflated air bag located under a cage of the bead setter rolls the fabric over the top of the bead wire and makes a fabric turn-up.

The turret 1000 then rotates under the control of a Geneva Drive mechanism 1200 and transfers the drum to a second turret 1100 with a pneumatic chuck for gripping the drum. The turret 1100 then rotates and positions the drum with respect to a second bead setter 1300A similar to the bead setter 1300. The bead setter 1300A is supplied with bead wires by a bead servicer 1500A similar to the bead servicer 1500 and applies the bead wire to the other end of the drum.

The turret 1100 then rotates the drum to a carcass remover 1700 where the carcass is clamped by a suitable mechanism and air is introduced under the carcass to permit the carcass to be pulled off the drum.

The carcasses may then be removed from the apparatus and stored for further processing, such as the application of tread stock, shaping and curing. The turret 1100 then rotates the drum to a return conveyor 1800 which transfers the drum to the band-positioning apparatus where the drum is introduced again into the line.

*Description and explanation of operation of the first fabric let-off assembly*

As shown schematically in FIG. 1, there are two fabric let-off assemblies, designated generally as 400 and 400A, in the machine. It is the function of the fabric let-off assemblies 400 and 400A to supply, upon demand, continuous sheets of coated weftless tire cord fabric (called, simply, "fabric" hereinafter), respectively, to the first and second winding frames 300 and 300A, the fabric supplied to the first or upstream winding frame 300 being helically wound at a predetermined pitch on the succession of axially interconnected drums driven axially and rotationally by the first winding frame 300 to form a continuous fabric tube comprising the first or inner carcass ply, and the fabric supplied to the second or downstream winding frame 300A being helically wound over the first ply at a predetermined pitch of opposite hand to form the second or outer carcass ply. The fabric supplied to the winding frames 300 and 300A by the fabric let-off assemblies 400 and 400A respectively must be and is supplied at precisely the desired pitch or angle with respect to the centerline of the advancing interconnected drums. Further, the fabric must be uniformly spread, and its edges must be reasonably precisely displaced transversely with respect to the path of travel of said fabric through said assembly into alignments, respectively, with two closely spaced helices on the lateral surfaces of the interconnected drums. This is necessary to ensure a closely controlled overlap of the edges of adjacent windings on the advancing drums. While a precise butting of the edges of adjacent windings would be ideal, a closely controlled overlap has been found more practical as avoiding the possibility of gaps. Except for being of opposite hand (because of the first and second plies are wrapped in different directions), the two fabric let-off assemblies 400 and 400A are identical; so only the upstream fabric let-off assembly 400 supplying the first winding frame 300 will be described in detail herein.

Figure 3:
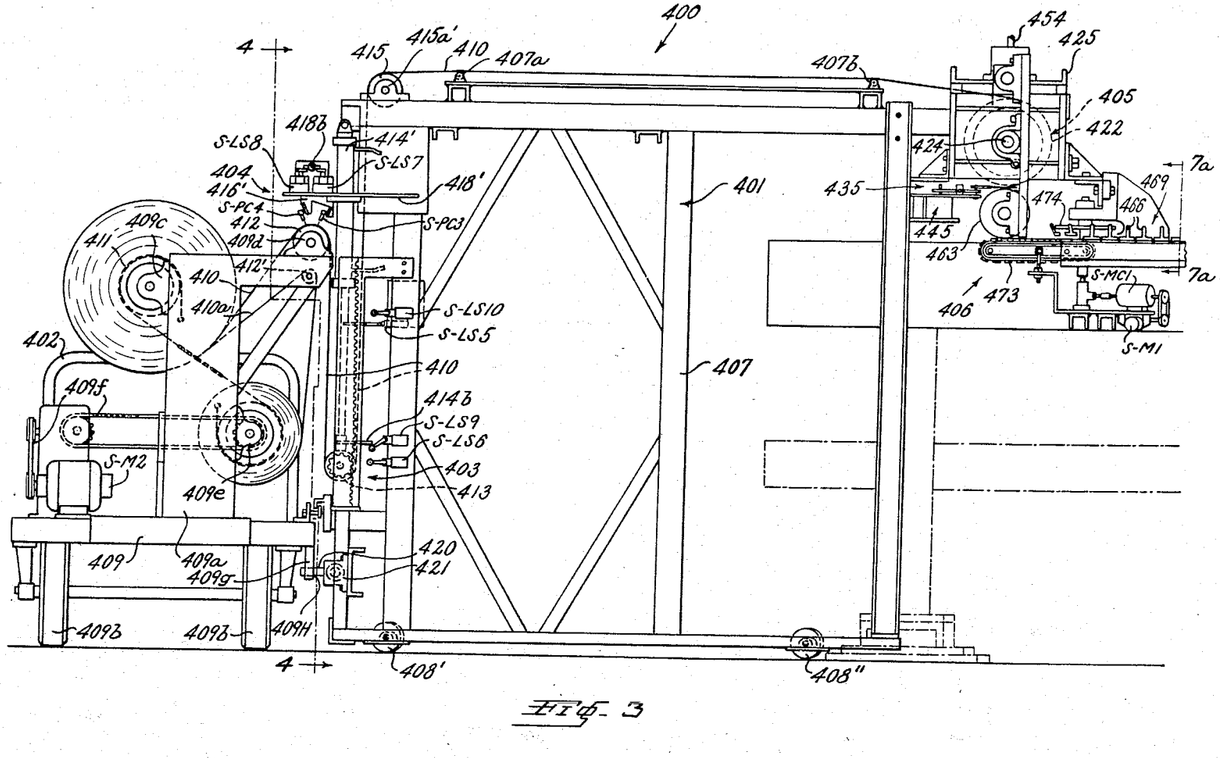
FIG. 3 is a side elevational view of the first fabric let-off assembly.

Referring now particularly to FIG. 3, the fabric let-off assembly 400 is comprised of the following major sub-assemblies: the support frame 401, the fabric supply truck assembly 402, the fabric tensioning assembly 403, the fabric centering control assembly 404, the fabric width control assembly 405 and the tentering assembly 406. The frame 401 is comprised simply of a rigid structure 407 mounted on directionally fixed casters 408 (FIG. 4), 408' and 408''. To or on frame 401, all of the other subassemblies of the let-off assembly 400 are fixedly or movably attached or mounted so that their relative positions and functions may be maintained while the entire let-off assembly 400 is moved relative to the winding frame 300 to adjust the angle of delivery of fabric to the winding frame 300 as will hereinafter be described.

The fabric supply truck assembly 402 is comprised of the wheeled truck 409 provided with an upstanding frame 409a, the wheels 409b on the truck being so oriented that the truck 409 may roll in a direction perpendicular to the direction of travel of the fabric 410 through the let-off assembly 400. Mounted in suitable bearings 409c is the fabric let-off roll or supply roll 411 from which the fabric 410 is released to the let-off assembly 400. The fabric 410 supplied on the drum 411 is wound with a liner 410a of plastic, uncoated fabric or other suitable material to prevent the successive windings of the tacky coated fabric 410 from sticking together. Means, not forming a part of this invention and not shown, are provided for replacing the roll 411 with a fresh roll of fabric when the fabric 410 on the roll 411 is exhausted. Alternatively, the supply roll 411 may be moved with the truck 409 to a separate station for rewinding while another truck and supply roll are substituted at the fabric let-off assembly 400. In such an event, the supply roll-liner roll drive S–M2 will be mounted on a separate truck and quick engagement means will be provided for engaging successive liner rolls with the drive and for disengaging them therefrom when the associated supply rolls are empty. The fabric 410 leaving the roll 411 is led over the polished metal light reflecting roller 412 mounted in suitable bearings 409d on the frame 409a and from thence is fed to the tensioning assembly 403. The liner 410a is led over the roll 412′ rotatably mounted on the frame 409a and, from thence, is wound upon the liner roll 409e (also rotatably mounted on the frame 409a). The liner roll 409e is driven, through suitable mechanical linkages 409f by the motor S–M2, the pull of the liner 410a providing the drive to rotate the fabric let-off roll 411.

Figure 4:
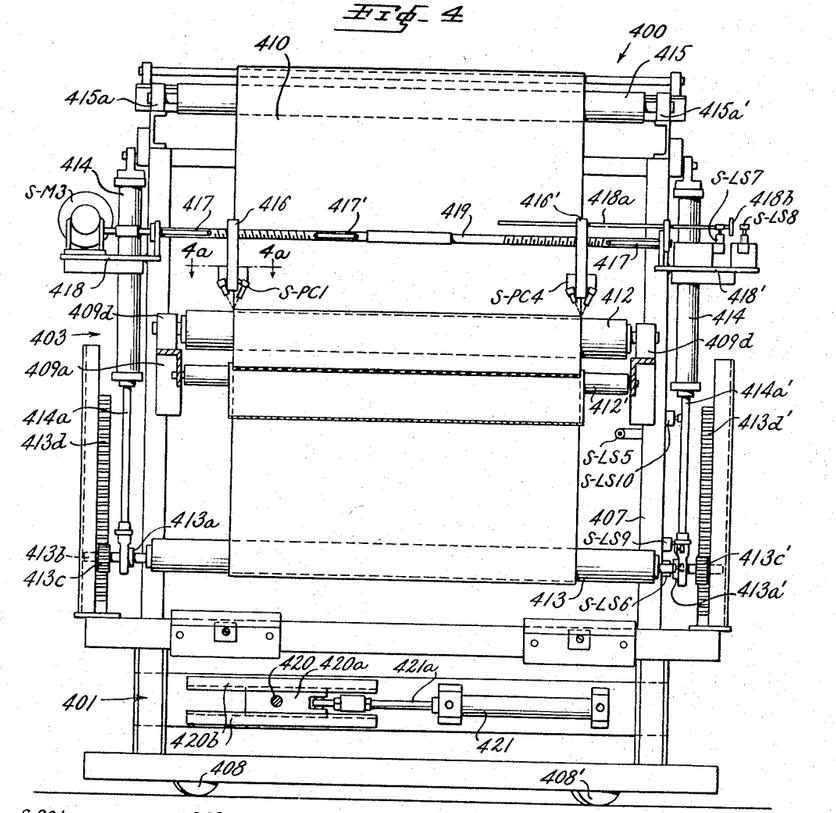
FIG. 4 is an elevational view of the fabric let-off assembly, looking downstream, taken along line 4—4 of FIG. 3.

Referring now to FIGS. 3 and 4, the fabric 410 passing over the roller 412 is next fed to the tensioning assembly 403. The tensioning assembly 403 comprises the dancer roll 413, rotatably mounted on shaft 413b which is, in turn, rotatably mounted in bearings 413a and 413a′ suspended from the piston rods 414a and 414a′ of pneumatic cylinder assemblies 414 and 414′. By this means, the dancer roll 413 is capable of upward and downward motion as well as rotation. The dancer roll shaft 413b is additionally provided at each end with pinions 413c and 413c′ which ride on the racks 413d and 413d′ mounted on the frame 407. It is the function of pinions 413d and 413d′ to keep the dancer roll 413 horizontal during its upward and downward motion. The fabric 410 passing over the roller 412 is next led downward and under the floating dancer roll 413 and then upward and over the idler roller 415 mounted in suitable bearings 415a and 415a′ on the top of the frame 407. It is the function of the pneumatic cylinder assemblies 414 and 414′, which are suspended from the frame 407 and are fed with air from a constant pressure regulated system, not shown, to maintain the proper tension in the fabric 410 passing through the let-off assembly 400.

The floating action of the dancer roll 413 has the additional function of maintaining a variable inventory of fabric 410 at this point in its passage from the let-off roll 411 to the winding frame 300. By this means the motor S–M2 driving the let-off roll 411 is permitted to operate intermittently to replenish this inventory whenever it is depleted, while there is always an inventory of the fabric 410 on hand to be drawn the balance of the way through the fabric let-off assembly 400 by the demand pull of the winding frame 300. When the inventory is so depleted that the dancer roll 413 has risen to a point where limit twitch S–LS10 will be actuated by the switch-actuator 414b mounted on the piston rod 414a′ then the motor S–M2 (by electrical means hereinafter described) will be started to supply more fabric 410 to the inventory thereby lowering the dancer roll 413. When sufficient fabric 410 has been supplied, the dancer roll 413 will reach a low position where the switch actuator 414b will actuate limit switch S–LS9 shutting off the motor S–M2 until more fabric 410 is demanded. In the event that the motor S–M2 fails to start in response to the signal from limit switch S–LS10, then limit switch S–LS5 will be actuated by the dancer roll 413, thereby failing the entire machine. Similarly, in the event that actuation of limit switch S–LS9 fails to shut off motor S–M2, then limit switch S–LS6 will be actuated by the switch actuator 414b, thereby failing the entire machine.

Referring now particularly to FIGS. 3, 4, 4a and 4b, the means by which the fabric 410 unwinding from the roll 411 is substantially centered before passing to the width control assembly 405 will be described. As the dark, coated fabric 410 passes over the light reflecting roller 412 it will be readily apparent to one skilled in the art that the presence or absence of fabric 410 at any point on the surface of the roller 412 can be readily determined by directing a light source at said point on the surface of the roller 412 and providing a properly oriented photoelectric cell to receive the reflection therefrom. There will be relatively low intensity reflection from the dark fabric 410 and relatively high intensity reflection from the polished roller 412. Accordingly, four separate photoelectric cells (complete with associated light sources) S–PC1, S–PC2, S–PC3 and S–PC4 are provided on the machine adjacent to the roller 412 as shown in the figures. In the figures the relative locations (transverse to the path of travel of the fabric 410) of the reflection points or sensing points on the surface of roller 412 at which the presence or absence of fabric 410 is determined by the four photoelectric cell units S–PC1, S–PC2, S–PC3 and S–PC4 are shown schematically by the four so identified impingement and reflection paths when the fabric 410 is centered on the roller 412. It has been found that ⅛ inch is a satisfactory transverse distance between the sensing points for each pair of photoelectric cells, that is, between S–PC1 and S–PC2 straddling one edge of the fabric 410 and between S–PC3 and S–PC4 straddling the other edge.

Figure 4A:
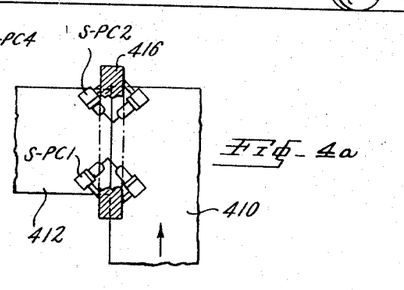
FIG. 4a is a detail of the fabric centering control assembly taken along line 4a—4a of FIG. 4.

The photoelectric cell units S–PC1 and S–PC2 are mounted (in accordance with the requirements set forth above) on a support plate 416 while the photoelectric cell units S–PC3 and S–PC4 are similarly mounted on a similar support plate 416′. Both support plates 416 and 416′ are, in turn, slidably mounted on elongated support means oriented parallel to the roller 412 comprising two parallel horizontal guide rods 417 and 417′, each said rod being affixed, at either end, to support brackets 418 and 418′ which are, in turn, each rigidly attached to the frame 407. Additionally, each support plate 416 and 416′ is provided with a threaded hole or bushing to mate with a power screw 419 rotatably mounted, at either end, in brackets 418 and 418′ and provided with threads of opposite hand at either end. The screw 419 is linked to and capable of being rotated (in either direction) by the motor S–M3 mounted on the support bracket 418. Affixed to the support plate 416′ is a rod 418a which passes slidably through a hole in the support bracket 418′ and is provided, at its end most remote from plate 416′, with a switch actuator 418b so arranged as to actuate limit switches S–LS7 or S–LS8 when the plate 416′ and rod 418a have traveled beyond predetermined limits in either direction under the drive of the screw 419.

Figure 10:
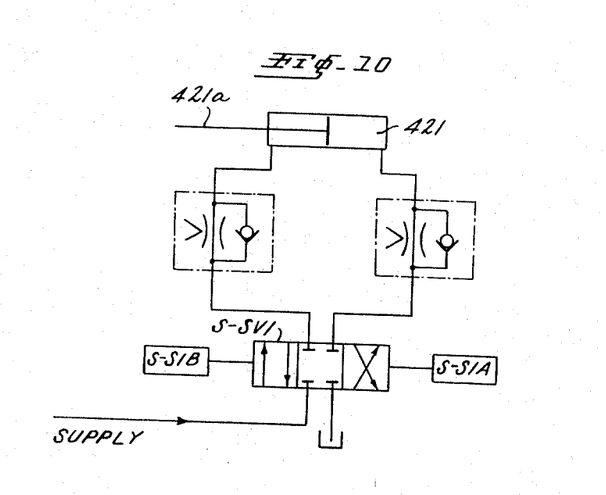
FIG. 10 is a schematic diagram of a portion of the hydraulic system utilized in the fabric let-off assembly.

Referring now particularly to FIGS. 3, 4, and 10, the balance of the fabric centering assembly 404 will be described. The truck 409 is provided with a depending plate 409g having a hole 409h therethrough. Mating with this hole 409h is the horizontal pin 420 mounted on the slider plate 420a which, in turn, is slidably mounted on the frame 407 so as to slide horizontally in the tracks 420b in a direction transverse to the path of travel of the fabric 410 through the let-off assembly 400. The slider plate 420a is, in turn, attached to the piston rod 421a of the hydraulic cylinder assembly 421. As is shown schematically in FIG. 10, hydraulic fluid may be admitted to either side of the hydraulic cylinder assembly 421 through a 3 position valve S–SV1 under the action of either solenoid S–S1A or solenoid S–S1B. In this manner the truck 409 can be moved transversely relative to the frame 407 either to the right or to the left (or may be held stationary) thereby shifting the fabric 410 to the right or to the left as it is released to the let-off assembly 400 from the supply roll 411.

Figure 4B:
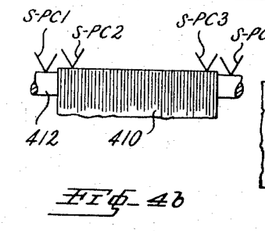
FIG. 4b is a schematic representation of the relative positions of the points of light measurement of the photoelectric cells employed in the fabric centering control assembly.

While a complete discussion of the functioning of the fabric centering assembly 404 will be deferred until the associated electrical system has been described hereinafter, the major mechanical aspects thereof will be discussed briefly at this point in the description. The two plates 416 and 416′ are so mounted as to be, at all times, disposed equidistant from the longitudinal centerline of the fabric let-off assembly 400 and, consequently, from the longitudinal midpoint of the roller 412. Therefore, when photocell unit S–PC1 "sees" reflected light, photocell unit S–PC2 "sees dark," unit S–PC3 sees dark and unit S–PC4 sees light, the fabric 410 passing over the roller 412 is substantially centered in the fabric let-off assembly 400 within acceptable tolerance limits, and the respective edges of the fabric 410 are passing through the sensing zones defined respectively by the sensing points for photocell units S–PC1 and S–PC2 and the sensing points for photocell units S–PC3 and S–PC4. When either unit S–PC1 or unit S–PC4 sees dark while the other sees light or when either unit S–PC2 or unit S–PC3 sees light while the other sees dark a signal is transmitted causing the hydraulic cylinder assembly 421 to shift the truck 409 to the right or to the left to correct this off-center condition. When, due to variations in fabric width, all units see dark or all units see light, then it is imposible to determine the centered or off-center condition of the fabric; so a signal is first transmitted causing the motor S–M3 to drive the screw 419 until (as required) plates 416 and 416′ have either been spread far enough so that at least one unit (either S–PC1 or S–PC4) sees light again or until plates 416 and 416′ have been brought close enough together so that at least one unit (either S–PC2 or S–PC3) again sees dark. Then the fabric 410 is again centered, if necessary, as previously described.

After passing through the tensioning assembly the centered fabric 410 is next drawn by the pull of the winding frame 300 up over the idler rollers 407a and 407b mounted on the top of the support frame 407 to the fabric width control assembly 405 which will now be described.

Figure 5:
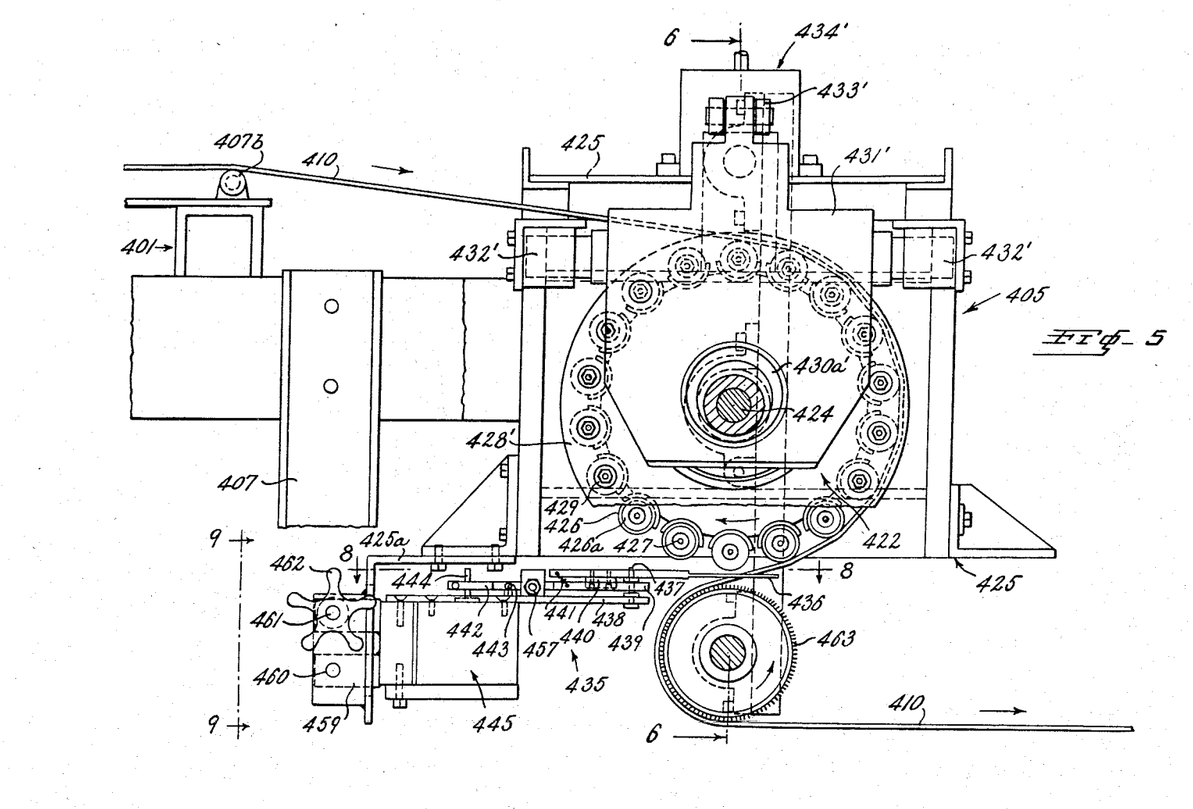
FIG. 5 is a side elevational view of the fabric with control assembly taken along line 5—5 of FIG. 6.
Figure 6:
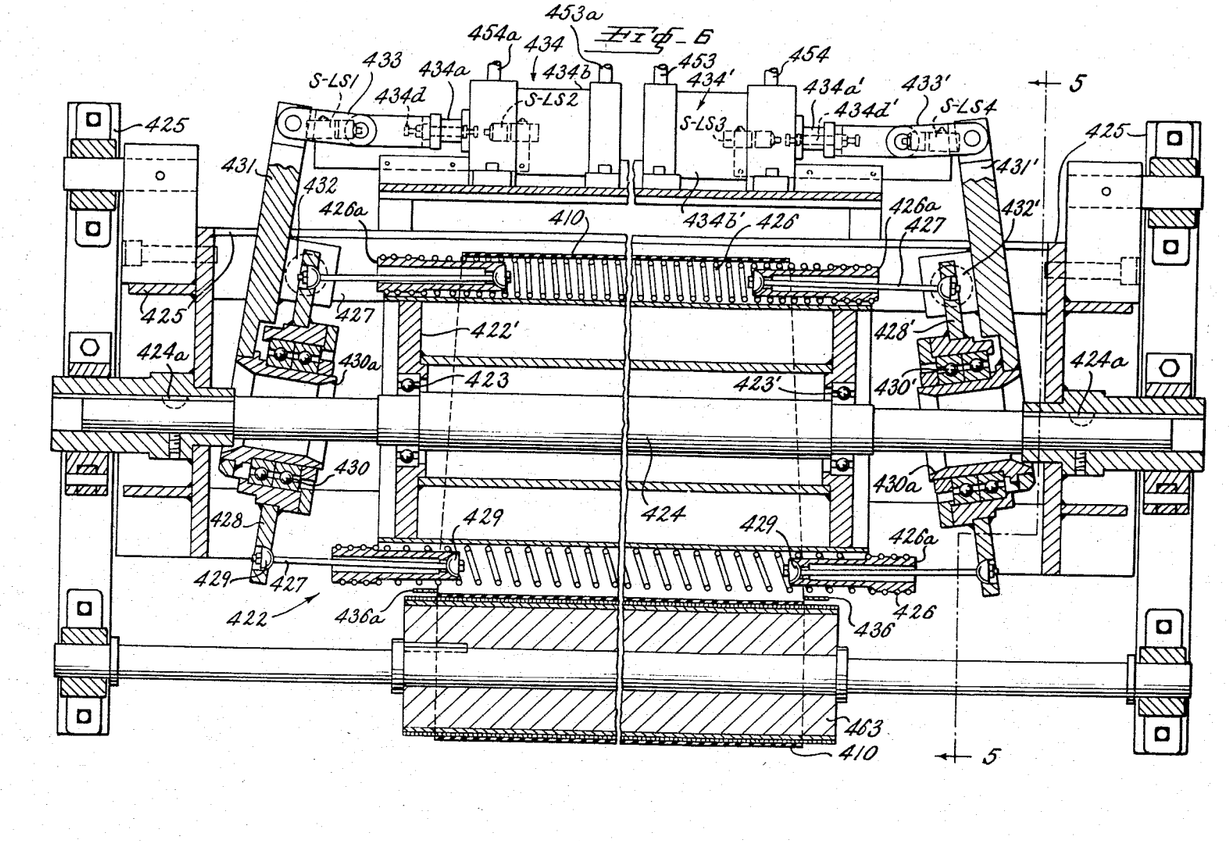
FIG. 6 is a sectional view, looking downstream of the fabric width control assembly taken along line 6—6 of FIG. 5.

Refering now particularly to FIGS. 5 and 6, the principal working component of the fabric width control assembly 405 is the fabric spreading roll 422 which is rotatably mounted, by means of bearings 423 and 423′ on a fixed axle 424. Both the axle 424 and the spreading roll assembly 422, the composite lateral surface of which is substantially cylindrical, possess a common horizontal axis disposed in a direction perpendicular to the path of travel of the fabric 410 through the let-off assembly 400. The respective ends of the axle 424 are fixedly mounted, by means of the keys 424a and 424a′, in the support structure 425 attached to the frame 407.

The cylindrical lateral surface of the spreading roll assembly 422 is comprised of a plurality of steel helical coil springs 426 disposed external to the surface of the spreading roll drum 422′ so that adjacent springs 426 almost touch each other, the respective axes of all of said springs 426 being parallel to the rotational axis of the spreading roll assembly 422. Each extremity of each spring 426 is connected by means of an interference fit with an end plug 426a which, in turn, is connected by a tension rod 427 to one of a pair of circular end plates 428 and 428′, the connections between the tension rods 427 and the end plugs 426a and between the tension rods 427 and the end plates 428 and 428′ being universal connections 429. The end plates 428 and 428′ are mounted so as to rotate on bearings 430 and 430′ about hubs 430a and 430a′. It should be noted that the end plates 428 and 428′ are not necessarily parallel to each other or perpendicular to the axle 424.

It should also be especially noted that the end plates 428 and 428′ are capable of pivoting or tilting as described below about axes which are substantially coplanar with the axis of whichever spring 426 is successively in the uppermost position with respect to the spreading roll assembly 422, that is, the spring 426 which is so positioned that it is then establishing contact with the fabric 410 to be spread. As a result of this location of the axes of pivoting of the end plates 428 and 428′, it may be said that these axes of pivoting lie substantially in the plane of the fabric 410 as it establishes contact with the spreading means 422. The pivoting of the end plates 428 and 428′ about axes so located is advantageous by comparison to pivoting the end plates 428 and 428′ about axes located in any other plane, as, for instance the plane passing through the centerline axis of the shaft and the spreading roll assembly 422, since pivoting about any such other axes would result in the introduction of error into the corrective action of the spreading roll assembly 422 responsive to the respective transverse edge locations of the fabric 410 leaving said assembly 422. This corrective or compensatory action of the spreading roll assembly 422 is more fully discussed hereinafter.

The hubs 430a and 430a′ which do not, in any operative position, touch the axle 424, are, in turn, fixedly mounted on a pair of lever plates 431 and 431′ which have, as their respective fulcrums the trunnion mountings 432 and 432′ on the support structure 425. The ends of the lever plates 431 and 431′ on the other side of the trunnions 432 and 432′ from the hubs 430a and 430a′ are connected, respectively, by linkages 433 and 433′ to the piston rods 434a and 434a′ of the hydraulic cylinder assemblies 434 and 434′, the cylinders 434b and 434b′ of which are, in turn, fixedly mounted on the support structure 425. It will be noted that, as hydraulic fluid is admitted to either side of hydraulic cylinder assemblies 434 and 434′, the resultant movements of the piston rods 434a and 434a′ will, through the linkages 433 and 433′ cause the lever plates 431 and 431′ to increase or decrease the "angle of tilt" from the horizontal of hubs 430a and 430a′. Also, when hubs 430a and 430a′ are tilted as shown in FIG. 6, the rotation of the drum 422′, springs 426 and end plates 428 and 428′ about the axle 424 will have the effect of causing each spring 426 to increase in length during its semicircumferential travel from its uppermost position to its lowermost position and to return to its original length during the completion of its rotation about the axle 424. Since, as shown in FIG. 5, the centered fabric 410 is held, by tension exerted by the winding frame 300 and the dancer roll 413, in non-slip contact with the springs 426 only as they are lengthening during their semicircumferential downward travel, the springs 426 apply a uniform stretch to the entire width of the fabric 410. It should be noted that the springs are made quite stiff to prevent the smaller force needed to stretch the fabric and the frictional forces on the springs from adversely affecting the uniformity of fabric stretch. The amount of this stretch is, of course dependent upon the angle of tilt from the vertical of end plates 428 and 428′, although, in practice, some stretch is always applied.

Figure 8:
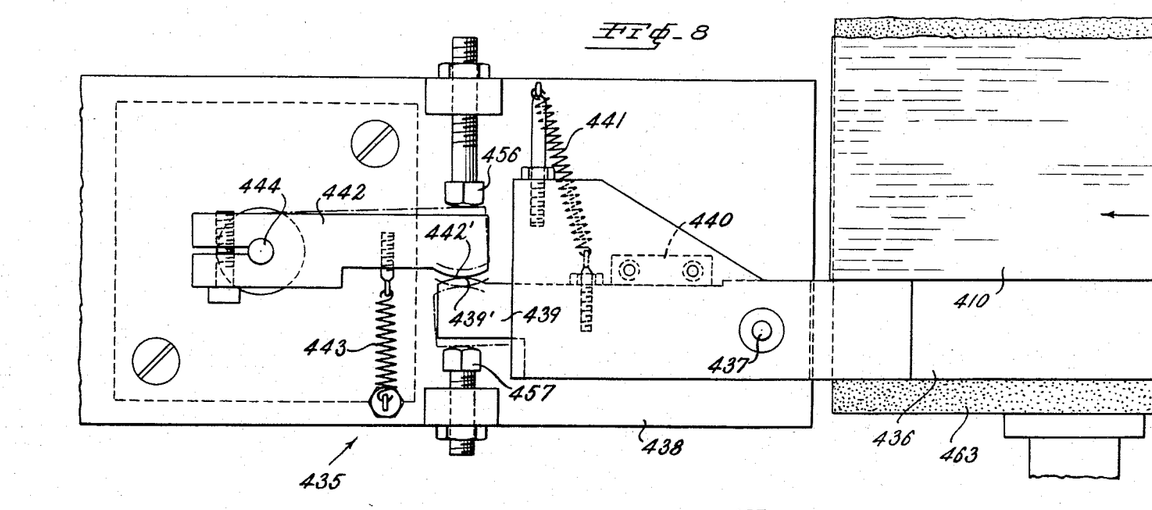
FIG. 8 is a plan view of one of the fabric edge control assemblies taken along line 8—8 of FIG. 5.

Mounted, on brackets 425a attached to support structure 425, on either side of the path of travel of the fabric 410 as it loses contact with the fabric spreading roll 422 are identical (except for being of opposite hand) fabric edge control units 435 and 435a. Referring now particularly to FIGS. 5 and 8 one of these edge control units 435, which control the action of the fabric spreading roll 422 to insure that the fabric supplied to the winding frame 300 is not only centered but is always of constant predetermined width, will be described. A ³⁄₁₆ inch clearance is maintained between the fabric spreading roll 422 and the card cloth roll 463 around which the fabric 410 next proceeds after leaving the fabric spreading roll 422. This clearance permits the feeler 436 of the edge control unit 435 to contact and sense the location of the moving edge of the fabric 410. This feeler 436 pivots about and is free to rotate on the upstanding pin 437 which is fixed to the plate 438. Also freely and separately rotatably mounted on the pin 437 is the lever 439. This lever 439 is contacted, on its edge nearest the fabric 410, by a stop plate 440 fixedly fastened in a depending position to the underside of the feeler 436. This lever 439 is also attached to the feeler 436 by means of the tensioned coil spring 441, the pull of which keeps the lever 439 against the stop plate when the feeler 436 is following the fabric 410 under "in-tolerance width conditions" so that, when the edge of the fabric 410 issuing from the spreading roll 422 is at or close to its proper location or alignment or is the fabric centerline than its proper location, the feeler 436 and the lever 439 will pivot about the pin 437 as a unit.

The arcuate surface 439′ at the end of lever 439 most remote from the pin 437 contacts an arcuate surface 442′ on the crank 442. The surfaces 439′ and 442′ are held in contact by the pull of the tensioned coil spring 443 which is attached to the crank 442 and the plate 438 so that, at or near desired fabric edge location conditions, any motion of the feeler 436 is translated, through the sliding rolling action of surfaces 439' and 442', into a rotation of crank 442 about the rotational axis of the shaft 444 of the "hydraulic relay" 445, the shaft 444 rotating with the crank 442 to which it is locked.

Figures 11, 12:
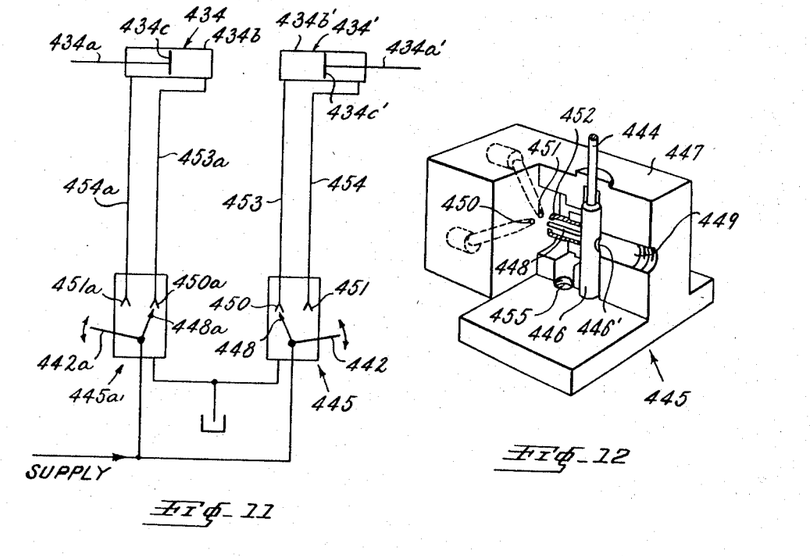
FIG. 11 is a schematic diagram of the hydraulic system utilized for controlling the width of the fabric leaving the fabric let-off assembly.
FIG. 12 is a partially schematic and partialy broken away isometric representation of the hydraulic relay employed in each edge control unit.

Referring now particularly to FIGS. 11 and 12, the structure and functioning of the identical "hydraulic relays," 445 and 445a will be described. It should be noted that there are commercially available hydraulic servo valves using the jet pipe principle described here. As the shaft 444 is rotated by the crank 442, the spool 446 is also rotated in the housing 447. Affixed to the spool 446 is the nozzle 448 through which is fed a constantly flowing stream of hydraulic fluid by way of the inlet passage 449 in the housing 447 and the port 446' through the spool 446 to the entrance of the nozzle 448. The stream of hydraulic fluid issuing from the nozzle 448 is directed at the port 450 or at the port 451 or at any point in between the ports 50 and 451 depending upon the degree of rotation of the shaft 444, spool 446 and nozzle 448, the distance between the ports 450 and 451 being small enough that when the nozzle 448 is rotated clockwise (as shown in FIG. 11) so that the fluid issuing therefrom no longer impinges on port 450 it will begin to impinge on port 451, there being no "dead" area of impingement between the ports 450 and 451. The nozzle guide 452 prevents the nozzle 448 from being directed to the right or to the left of both ports 450 and 451. Since the ports 450 and 451 are connected, by conduits 453 and 454, to opposite sides of the hydraulic cylinder assembly 434' a flow of hydraulic fluid will occur in the conduits 453 and 454 whenever the nozzle 448 is directed in any direction other than midway between the ports 450 and 451. When, for instance, the nozzle 448 is directed full at port 450 or more nearly at port 450 than at port 451, fluid will flow to the cylinder housing 434b' through conduit 453 and from the cylinder housing 434b' through the conduit 454, whereby the piston 434c' and piston rod 434a' will be moved to the right (as shown in FIG. 11). This causes the lever plate 431' (as shown in FIG. 6) to be moved to a more nearly vertical position which results in less spreading action being applied to the fabric 410 passing around the spreading roll 422. The opposite action occurs throughout the system when the nozzle 448 is directed full at or more nearly towards the port 451. Since this hydraulic system is a closed system, the same amount of fluid is constantly passed out of the housing 447 through the outlet port 455 (FIG. 12) as is admitted through the inlet port 449.

The action of the edge control unit 435a and its associated hydraulic system and "hydraulic relay" 445a with respect to the hydraulic cylinder assembly 434 is identical and, therefore, will not be described in detail herein. It should be noted that since the action of the fabric spreading roll 422 results in the application of a substantially uniform and equal stretch to each longitudinal half of the centered fabric 410, the feelers 436 and 436a following the opposite edges of the fabric 410 will normally move substantially in unison and in opposite directions, of course, and the distances by which the piston rods 434a and 434a' are extended from the cylinder housing 434b and 434b' will be substantially equal. In any event, since the springs 426 will be uniformly stretched throughout, the fabric will be uniformly spread, while any slight misalignments of the fabric edges relative to the desired alignments of the fabric edges will be corrected by transverse displacement of the fabric edges to the end that the edges of adjacent windings of the fabric 410 on the drums passing through the winding frame 300 will be applied to the drums with a substantially constant controlled overlap.

As previously noted, no useful purpose would be served by directing the nozzle 448 either to the right or to the left of both ports 450 and 451, and such an eventuality is prevented by the nozzle guide 452. However, in order to prevent the possibility of damage to the nozzle resulting from too great a torque being applied to the crank 442, the stops 456 and 457 are provided on the plate 438 (FIG. 8). These stops 456 and 457 may be adjusted so that the crank 442 may not be rotated so far in either direction as to cause the nozzle 448 to bear against the guide 452 and so that the stream of hydraulic fluid issuing from the nozzle 448 will always be directed either fully at port 450, fully at port 451 or in some intermediate direction.

In view of the action of the stops 456 and 457, it will be noted that, when the fabric 410 issuing from the spreading roll 422 becomes unusually narrow, the feeler 436 will lose contact with the fabric 410 after the lever 439 has contacted the stop 457. Under this condition the crank 442 will be held against the lever 439 by the spring 443 and the nozzle 448 will be directed fully at the port 451 causing a flow of fluid to the cylinder 434b' (FIG. 6) through the conduit 454 and causing a maximum rate of increase in the spreading action of the roll 422 until contact between the feeler 436 and the fabric 410 is again established. In the event that such contact is not established when the piston rod 434a' is fully retracted into the cylinder assembly 434', the switch actuator 434d' mounted on the rod 434a' will actuate limit switch S–LS3 shutting down the machine. Similar action in the opposite edge control unit 435a will ultimately result in the actuation of limit switch S–LS1 thereby also shutting down the machine.

On the other hand, should the fabric 410 issuing from the spreading roll 422 become unusually wide, the crank 442 will rotate only until it contacts the stop 456, lever 439 coming to rest against the crank 442. However, the feeler 436 will continue to follow the edge of the fabric 410 by rotating about the pin 437 and the spring 441 will stretch to accommodate this relative rotation of the feeler 436 and the lever 439. Since, when the crank 442 is at rest against the stop 456, the nozzle 448 will be directed fully at the port 450 and the flow of fluid to the cylinder 434b' through conduit 453 will be at the maximum rate. The piston rod 434a' will extend from the cylinder assembly 434' at the maximum rate until the resultant action on the spreading roll 422 has cause the crank 442 to lose contact with the stop 456. If this has not occurred before the piston rod 434a' is fully extended, limit switch S–LS4 will be actuated by switch actuator 434d' thereby shutting down the machine. Similar action ta the opposite edge control unit 435a will result in the actuation of limit switch S–LS1 thereby also shuting down the machine.

Figure 9:
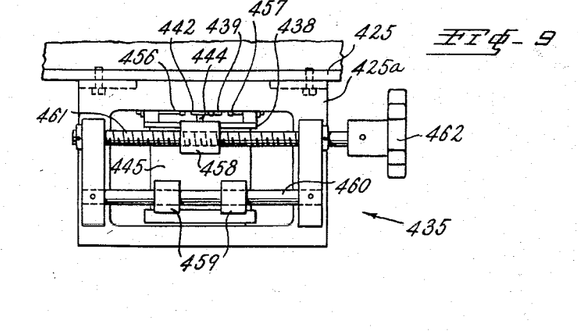
FIG. 9 is an elevational view of the fabric edge control unit of FIG. 8 taken along line 9—9 of FIG. 5.

Referring now particularly to FIGS. 5 and 9, it may be seen that the plate 438 is attached to the hydraulic relay 445 and that attached to this assembly are a nut 458 and two guide bushings 459. By means of these guide bushings 459 the entire edge control unit 435 is slidably mounted on the transverse guide rod 460 which, in turn, is fixed to the bracket 425a so that the edge control unit 435 may slide horizontally thereon in a direction perpendicular to the path of travel of the fabric 410. By means of the hand wheel 462 and the screw 461, which mates with the nut 458, the location of the entire edge control unit 435 may be adjusted in a direction perpendicular to the path of travel of the fabric 410 in order to preset the desired width to which the fabric 410 is to be spread by the spreading roll 422.

As the fabric 410 leaves the spreading roll 422 it has previously been centered and spread to its desired width. In other words, the respective edges of the fabric 410 have been aligned with two closely spaced parallel helices on the lateral surfaces of the drums passing through the winding frame 300. It is now necessary to substantially maintain both edges in their respective desired alignments until the fabric 410 can be wound around the line of axially interconnected drums being driven through the winding frame 300. To accomplish this objective, the fabric 410 is first passed semicircumferentially around the card cloth covered roller 463 which is rotatably mounted in the position shown in FIG. 5 in the support frame 425. By this means, the direction of travel of the fabric 410 is again directed toward the winding frame 300 while the card cloth surface on the roller 463 prevents the fabric 410 from shifting transversely or shrinking in width. As may best be seen in FIG. 2, at this point in its travel, the edge of the fabric 410 nearest the winding frame 300 or, as it is hereafter called, the "inboard edge" will be very close to the point at which it will contact the advancing drums in the process of being wound thereon by the action of the winding frame 300. The edge of the fabric 410 most remote from the winding frame 300 or the "outboard edge" will, however, due to the angular orientation of the fabric let-off assembly 400 with respect to the winding frame 300, still be quite remote from its point of contact with the advancing drums. In view of this fact, if both edges of the fabric 410 were simply released upon leaving the card cloth roll 463, the inboard edge of the fabric 410 would be deposited almost without change in alignment upon the advancing drums, while the outboard edge would, because of the tendency of the fabric 410 to resume its condition before being spread by the roll 422, shift appreciably toward the inboard edge before contacting the drums. The net results would be a shifting (by varying distances) of all points on the fabric 410 toward the inboard edge, an uneven spread in the fabric as ultimately wound on the drums and a loss of control of the overlap of adjacent windings on the drums. To prevent these results, then a mechanism has been provided to tenter the outboard edge so that it will be released from its alignment as fixed by the card cloth roll 463 only when said edge has reached a point at which its distance from the drums is as small as permitted by machine interferences.

Figures 7, 7A:
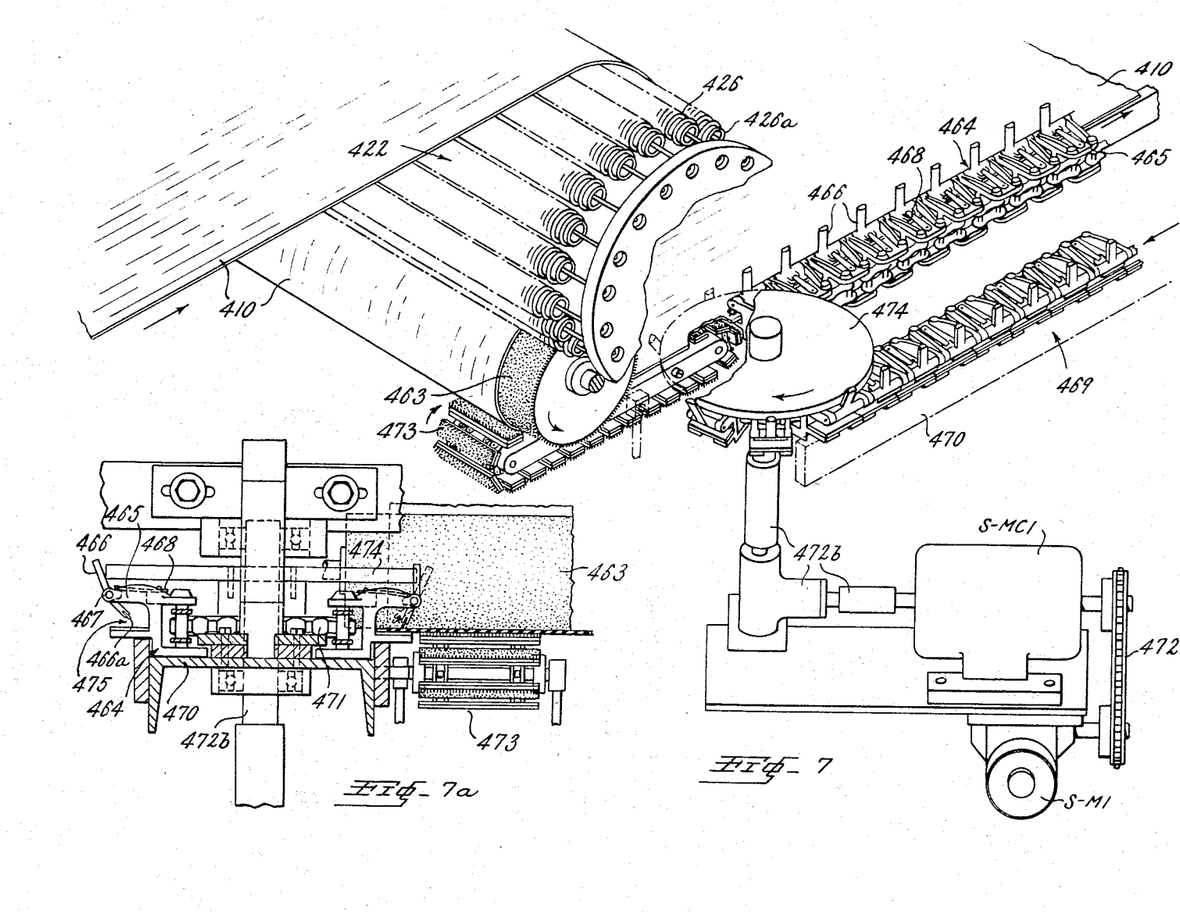
FIG. 7 is a partially schematic, partially broken away isometric view of the working components of the tentering assembly.
FIG. 7a is a partially sectioned view of the tentering assembly looking upstream taken along line 7a—7a of FIG. 3.

Referring now particularly to FIGS. 7 and 7a the tentering unit basically comprises a standard commercially available fabric edge tentering conveyor well known in the textile art. A series of spring-loaded tentering clips 464, each comprising a frame or body 465, a clamping lever 466 pivotally mounted with respect to the frame 465 by means of a fulcrum pin 467, and a leaf spring 468 affixed to the frame 465 and bearing against the lever 466, thereby tending to depress the clamping edge 466a of the lever 466 into clamping contact with the frame 465, are joined together to form an endless flexible chain 469. The chain 469 is mounted on the track 470 (see also FIG. 2) and travels in an endless path thereon passing around the driven sprocket 471 at the end of the track 470 nearest the card cloth roller 463 and around the idler sprocket 471' at the end of the track 470 nearest the winding frame 300. The length of the track 470 is adjustable in steps to keep the idler sprockets 471' as near the drums as possible for different angular positions of the track 470 with respect to the winding frame 300. A low torque drive is imparted to the driven sprocket 471 and the tentering clip chain 469 by the motor S–M1 through the drive chain 472a, magnetic slip clutch S–MC1 and rotating shaft system 472b. The clutch S–MC1 is so designed and adjusted as to transmit to the tentering clip chain 469 just sufficient driving force so as to substantially overcome the frictional drag of the chain 469 when tentering the fabric 410. Therefore, the winding frame 300, which actually provides the drive to move the fabric 410 through the entire fabric let-off assembly 400 exerts a substantially equal tensile force on both the inboard and outboard edges of the fabric 410.

As the outboard edge of the fabric 410 leaves the card cloth covered roller 463, the fabric 410 is picked up and intermediately tentered by the card cloth covered belt 473 which is not driven and is, therefore, dragged in an endless path by the fabric 410. This belt 473 engages the fabric 410 so as to leave the outboard edge thereof projecting. As each tentering clip 464 in the chain 469 reaches the driven sprocket 471, the top end of the clamping lever 466 is engaged and forced radially outward with respect thereto by the disc 474 which is mounted on and rotated by the same shaft system 472b as is the driven sprocket 471. The card cloth belt 473 continues to tenter the fabric 410 until the projecting outboard edge has travelled to a point where it will be clamped by the tentering clips 464.

This clamping action is achieved as follows. When the lever 466 of each clip 464 is rotated on its fulcrum pin 467 by coming in contact with the disc 474, the clamping edge 466a of the lever 466 is lifted from the frame 465 leaving a gap 475 between the clamping edge 466a and the frame 465. As each clip 464 then moves around the driven sprocket 471 and the disc 474, the projecting outboard edge of the fabric 410 becomes inserted into this gap 475. As the upper end of the lever 466 loses contact with the disc 474 the action of the spring 468 forces the lever 466 to rotate about the pin 467 to firmly clamp the outboard edge of the fabric 410 between the clamping edge 466a and the frame 465. It should be noted that any "pull" exerted by the fabric 410 tending to shrink to its unspread condition only serves to tighten the grip of the clip 464 on the fabric 410.

When clip 464 reaches the end of the track 470 nearest the winding frame 300 (see FIG. 2) and is about to engage the idler sprocket 471', its lever 466 is contacted and again rotated by a similar disc 474' which causes the fabric 410 to be successively released by each clip 464 at a location as near to the point of its being laid down on the drums advancing through the winding frame 300 as is permitted by machine interferences.

Figure 2:
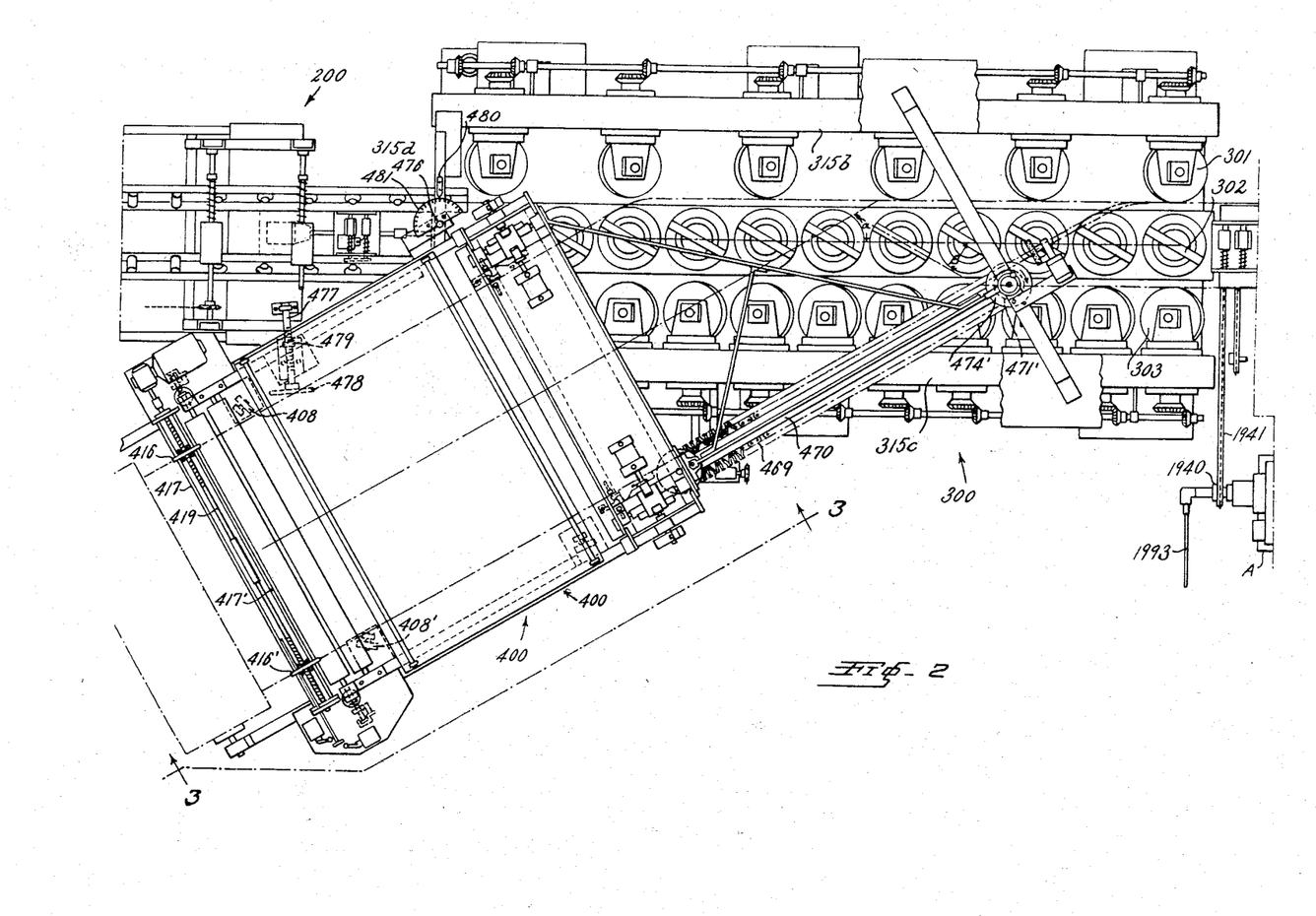
FIG. 2 is a plan view of the first winding frame.

The necessity and means for centering the fabric 410 quite exactly in the fabric let-off assembly 400 and for spreading and thereafter tentering said fabric 410 to desired width until it is wrapped on the drums advancing through the winding frame 300 have already been described. As previously indicated one further quality of the fabric delivered to the winding frame 300 from the fabric let-off assembly 400 must be closely controlled. This is the pitch of the fabric as wound on the drums which is determined by the angular orientation $\alpha$, in a horizontal plane, of the centerline of the fabric 410 delivered to the winding frame 300 with respect to the longitudinal axis of the locked drums passing through the winding frame 300 (FIG. 2). This angle $\alpha$ must be equal to the angle $\beta$ formed by the plane of rotation of the drive wheels 302 with the longitudinal axis of the locked drums advancing through the winding frame 300 although these respective angles $\alpha$ and $\beta$ will fall on opposite sides of the axis of the advancing drums. The angular orientation $\alpha$ of the fabric 410 with respect to the winding frame 300 is controlled by manually adjusting the angular orientation of the entire fabric let-off assembly 400 with respect to the winding frame 300 at the same time as the angular orientations $\beta$ of the drive wheels 301, 302 and 303 are adjusted. This will always be when the machine is not in operation. Improper orientation of the let-off assembly 400 will result in the fabric 410 being subjected to bending in its own plane, and the ultimate effect will be wrinkles in the carcass plies.

Referring now particularly to FIG. 2, the entire fabric let-off assembly 400 is pivotally attached, at the pivot point 476, to a thrust bearing mounted on a cross-piece 315d which, in turn, is fixedly mounted atop the side frames 315b and 315c of the winding frame 300. The entire fabric let-off assembly 400 may be rolled about the pivot point 476 on the casters 408, 408' and 408'' (see FIGS. 3 and 4). To fix as well as to change the angular orientation of the fabric let-off assembly 400 about the pivot point 476, the fabric let-off assembly 400 is attached to the frame of the drum loader 200 by means of a screw 477 provided with a handwheel 478 rotatably attached to said frame. Screw 477 mates with a nut 479 affixed to the frame 407 of the fabric let-off assembly 400. The angular orientation of the path of the fabric 410 with respect to the winding frame 300 is at all times indicated by the pointer 480 mounted on the cross-piece 315d and the protractor 481 mounted on the let-off assembly 400.

Figure 13:
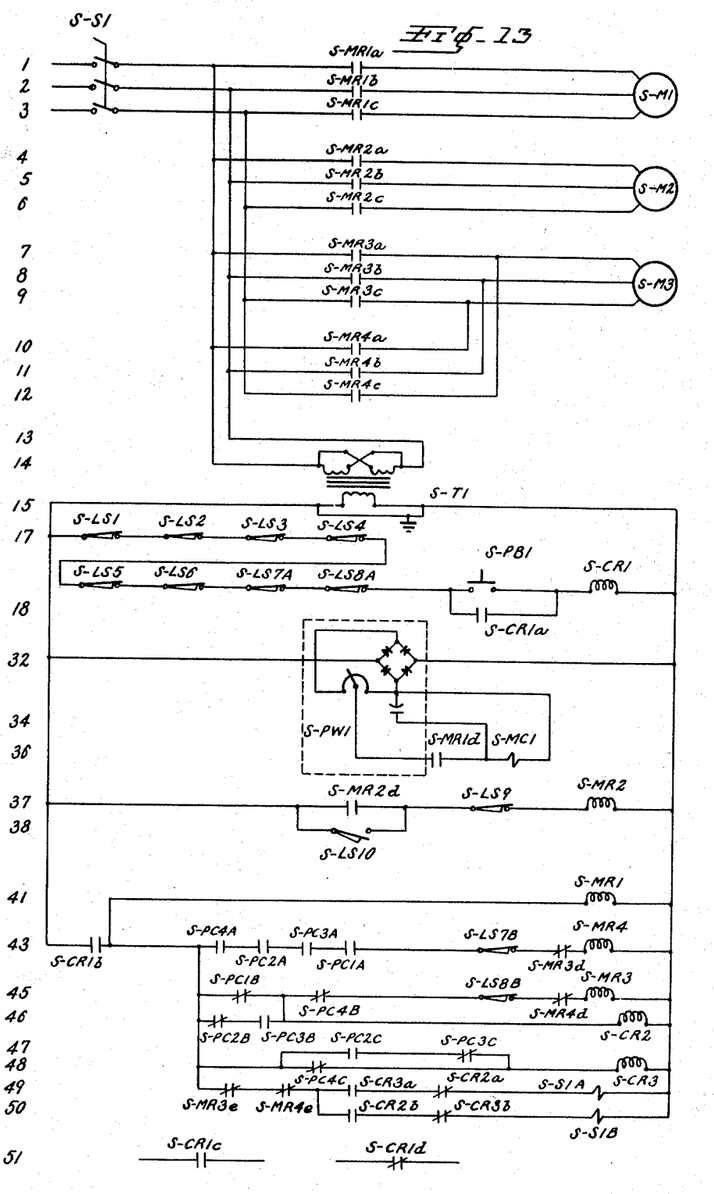
FIG. 13 is an electrical diagram of the control circuit of the first fabric let-off assembly.

Referring now particularly to FIG. 13, the operation of the electrical drive and control system for the fabric let-off assembly 400 will be described. As a starting point in this description it will be assumed that the machine and the fabric let-off assembly 400 are in normal automatic operation, that the fabric 410 just supplied and/or being supplied to the let-off assembly 400 from the fabric supply roll 411 is perfectly centered, that photoelectric cell units S–PC1 and S–PC4 are "seeing light" while photocell units S–PC2 and S–PC3 are "seeing dark," that the edge control units 435 and 435a are detecting fabric 410 of the exactly desired width, each edge of the centered fabric 410 being, therefore, in alignment with the intended helix of application of said edge to the axially interconnected drums, that the dancer roll 413 is in a position intermediate between limit switches S–LS9 and S–LS10, that the motor S–M2 is not running, and that the winding frame 300 is drawing fabric 410 through the let-off assembly 400. The electrical conditions in the control system, then, are as follows: main switch S–S1 (lines 1–3) is closed supply 220 volt, three phase current to the motor drive system; transformer S–T1 (lines 14–15) is, therefore, energized supplying 110 volt, single phase current to the control system; limit switch contacts S–LS1 (line 17), S–LS2 (line 17), S–LS3 (line 17), S–LS4 (line 17), S–LS5 (line 17), S–LS6 (line 17), S–LS7A (line 17), S–LS8A (line 17), S–LS7B (line 43) and S–LS8B (line 45) are all closed, none of these switches being actuated; control relay S–CR1 (line 17) has previously been energized by momentarily closing the start button S–PB1 (line 17) and is now locked in by a closed relay contact S–CR1a (line 18); relay contact S–CR1b (line 43) is closed providing a path for energization of the fabric centering controls; relay contact S–CR1c (line 51) is closed and contact S–CR1d (line 51) is open signalling the main panel that the fabric let-off assembly 400 is in operating condition; motor relay S–MR1 (line 41) is energized and relay contacts S–MR1a (line 1), S–MR1b (line 2), S–MR1c (line 3) and S–MR1d (line 36) are closed; motor S–M1 (lines 1–3), the tentering drive, is running and the magnetic slip clutch S–MC1 (line 36) is energized through contact S–MR1d (line 36) and power supply S–PW1 (line 32); motor relay S–MR2 (line 37) is unenergized, limit switch contact S–LS10 (line 38) being open and unactuated and locking contact S–MR2d (line 37) being open; contacts S–MR2a (line 4), S–MR2b (line 5) and S–MR2c (line 6) are open and motor S–M2 (lines 4–6), the fabric supply motor, is not running; limit switch S–LS9 (line 37) is closed and unactuated; the various photocell actuated contacts are in the following conditions (their respective closing conditions being also indicated as follows: DC—closed when "seeing dark," LC—closed when "seeing light"): S–PC1A (LC) (line 43) is closed, S–PC1B (DC) (line 45) is open, S–PC2A (LC) (line 43) is open, S–PC2B (DC) (line 46) is closed, S–PC2C (LC) (line 47) is open, S–PC3A (LC) (line 43) is open, S–PC3B (LC) (line 46) is open, S–PC3C (DC) (line 47) is closed, S–PC4A (LC) (line 43) is closed, S–PC4B (DC) (line 45) is open and S–PC4C (DC) (line 48) is open; motor relays S–MR3 (line 45) and S–MR4 (line 43) are unenergized, contacts S–MR3a (line 7), S–MR3b (line 8), S–MR3c (line 9), S–MR4a (line 10), S–MR4b (line 11) and S–MR4c (line 12) are open, and motor S–M3 (lines 7–9) is not running in either direction; contacts S–MR3d (line 43), S–MR4d (line 45), S–MR3e (line 49) and S–MR4e (line 49) are closed; control relays S–CR2 (line 46) and S–CR3 (line 48) are not energized; relay contacts S–CR3a (line 49) and S–CR2b (line 50) are, therefore, open while contacts S–CR2a (line 49) and S–CR3b (line 50) are closed; and solenoids S–C1A (line 49) and S–S1B (line 50) are not energized, hence solenoid valve S–SV1 (FIG. 10) is closed.

Considering first the operation of the supply truck assembly 402 and the fabric tensioning assembly 403, as the winding frame 300 continues to draw fabric 410 through the let-off assembly 400, the dancer roll 413 rises until the switch actuator 414b contacts and actuates limit switch S–LS10 closing switch contact S–LS10 (line 38). This action completes a circuit through S–LS10 (line 38) and S–LS9 (line 37) energizing motor relay S–MR2 (line 37). Contact S–MR2d (line 37) closes locking in relay S–MR2 (line 37) and contacts S–MR2a (line 4), S–MR2b (line 5) and S–MR2c (line 6) close starting motor S–M2 (lines 4–6). As fabric 410 is fed to the fabric tensioning assembly 403 from the fabric supply roll 411, the dancer roll 413 and the switch actuator 414b descend deactuating limit switch S–LS10. Contact S–LS10 (line 38) opens, but relay S–MR2 (line 37) remains locked in through contacts S–MR2d (line 37) and S–LS9 (line 37).

When the dancer roll 413 has descended far enough (and the tensioning assembly 403 has its full inventory of fabric 410) the switch actuator 414b actuates limit switch S–LS9 opening contact S–LS9 (line 37) and thereby de-energizing relay S–MR2 (line 37). Contacts S–MR2a (line 4), S–MR2b (line 5), S–MR2c (line 6) and S–MR2d (line 37) open and motor S–M2 (lines 4–6) stops. Then, as the dancer roll 413 again begins to rise, contact S–LS9 (line 37) again closes readying a path for the next energization of relay S–MR2 (line 37).

If the dancer roll 413 and the switch actuator 414b should override limit switch S–LS10 to actuate switch S–LS5, contact S–LS5 (line 17) will open de-energizing the fail relay S–CR1 (line 17) and shutting down the entire machine. Similarly, an override of switch S–LS9 causes contact S–LS6 (line 17) to open shutting down the entire machine before apparatus or fabric can be damaged.

Considering now the operation of the fabric centering control assembly 404, it will be apparent that the following several conditions will cause this control system to act:

(1) photocell S–PC1 sees dark.
(2) photocell S–PC4 sees dark.
(3) photocell S–PC2 sees light.
(4) photocell S–PC3 sees light.
(5) photocell S–PC1 sees dark while S–PC3 sees light.
(6) photocell S–PC4 sees dark while S–PC2 sees light.
(7) photocells S–PC1 and S–PC4 both see dark.
(8) photocells S–PC2 and S–PC3 both see light.

The first six of these conditions indicate that the fabric "wandered" off center on the roller 412 while the last two indicate that the fabric 410 has varied in width and may have wandered off center.

Under condition 1, contact S–PC1A (LC) (line 43) will open but no action will rseult. Contact S–PC1B (DC) (line 45) will close energizing relay S–CR2 (line 46). Contact S–CR2a (line 49) will open but no action will result; however contact S–CR2b (line 50) will close energizing solenoid S–S1B (line 50) which, in turn, opens solenoid valve S–SV1 (FIG. 10) to admit fluid to cylinder 421 so as to retract the piston rod 421a and move the truck 409 to correct the fabric wander. When sufficient correction has been applied so that S–PC1 again sees light, contact S–PC1A (LC) (line 43) will close, and contact S–PC1B (DC) (line 45) will again open de-energizing relay S–CR2 (line 46). Contact S–CR2a (line 49) will close and contact S–CR2b (line 50) will open, de-energizing solenoid S–S1B (line 50), and closing valve S–SV1 restoring the circuit to normal with the truck 409 remaining in its new position.

Under condition 2, contact S–PC4A (LC) (line 43) will open but no action will result. Contact S–PC4B (DC) (line 45) will close, but no action will result because S–PC1B (DC) (line 45) and S–PC3B (LC) (line 46) remain open. Contact S–PC4C (DC) (line 48) will close energizing relay S–CR3 (line 48). Contact S–CR3*b* (line 50) will open insuring that solenoid S–S1B (line 50) will not become energized, and contact S–CR3*a* (line 49) will close energizing solenoid S–S1A (line 49). Valve S–SV1 (FIG. 10) will be opened to admit fluid to cylinder 421 moving the truck 409 in the opposite direction from the movement under condition 1 until the wander is corrected and S–PC4 again sees light. The circuit will then be restored to normal in a manner similar to that described under condition 1.

Under condition 3, contact S–PC2A (LC) (line 43) will close, but no action will result since contact S–PC3A (LC) (line 43) remains open. Contact S–PC2B (DC) (line 46) will open but no action will result. Contact S–PC2C (LC) (line 47), however, will close energizing relay S–CR3 (line 48) which results in the same corrective action as in condition 2 above.

Under condition 4, contact S–PC3A (LC) (line 43) will close, but no action will result since S–PC2A (LC) (line 43) remains open. Contact S–PC3C (DC) (line 47) will open preventing relay S–CR3 (line 48) from becoming energized. Contact S–PC3B (LC) (line 46) will close energizing relay S–CR2 (line 46) which results in the same corrective action as in condition 1 above.

Under condition 5, contact S–PC1A (LC) (line 43) will open and contact S–PC3A (LC) (line 43) will close, but no action will result since these two actions neutralize each other and, in any event, contact S–PC2A (LC) (line 43) remains open. Contact S–PC1B (DC) (line 45) will close and contact S–PC3B (LC) (line 46) will close providing parallel paths for the energization of relay S–CR2 (line 46). Then the same corrective action will occur as under conditions 1 and 4 above.

Under condition 6, contact S–PC4A (LC) (line 43) will open and contact S–PC2A (LC) (line 43) will close, but no action will result since these two actions neutralize each other and, in any event, contact S–PC3A (LC) (line 43) remains open. Contact S–PC4B (DC) (line 45) will close and contact S–PC2B (DC) (line 46) will open, no action resulting as contacts S–PC1B (DC) (line 45) and S–PC3B (LC) (line 46) remain open. Contacts S–PC2C (LC) (line 47) and S–PC4C (DC) (line 48) will both close providing parallel paths for the energization of relay S–CR3 (line 48) and the same corrective action will occur as under conditions 2 and 3 above.

Under condition 7, contacts S–PC1A (LC) (line 43) and S–PC4A (LC) (line 43) open, contacts S–PC2A (LC) (line 43) and S–PC3A (LC) (line 43) already being open; so motor relay S–MR4 (line 43) does not become energized. Contact S–PC1B (DC) (line 45) closes energizing relay S–CR2 (line 46) and contact S–PC4C (DC) (line 46) closes energizing relay S–CR3 (line 48). Contacts S–CR3*a* (line 49) and S–CR2*b* (line 50) close, but contacts S–CR2*a* (line 49) and S–CR3*b* (line 50) open; so neither solenoid S–S1A (line 49) nor solenoid S–S1B (line 50) become energized because, until the location of at least one edge of the fabric 410 is determined by the control system, it will not be apparent whether the cart 409 should be shifted to the right or to the left or should be held stationary. Contact S–PC4B (DC) (line 45) will close energizing motor relay S–MR3 (line 45). Contacts S–MR3*a* (line 7), S–MR3*b* (line 8) and S–MR3*c* (line 9) will close starting motor S–M3 (lines 7–9) rotating in such a direction that supports 416 and 416' carrying, respectively, photocell units S–PC1 and S–PC4, will move apart at equal rates until either S–PC1 or S–PC4 or both see light again. Simultaneously, contact S–MR3*d* (line 43) will open doubly insuring that relay S–MR4 (line 43) will not become energized and contact S–MR3*e* (line 49) will open doubly insuring that neither solenoid S–S1A nor solenoid S–S1B will become energized. If neither S–PC1 nor S–PC4 sees lights until they have spread to accommodate the maximum fabric width limit which the let-off assembly 400 will tolerate, limit switch S–LS8 will be actuated. Contact S–LS8B (line 45) will be opened de-energizing motor relay S–MR3 (line 45) and contact S–LS8A (line 17) will open shutting down the entire machine by de-energizing the fail relay S–CR1 (line 17).

As soon, however, as either S–PC1 or S–PC4 sees light (before reaching the fail limit) contact S–PC1B (DC) (line 45) or contact S–PC4B (DC) (line 45) will open de-energizing relay S–MR3 (line 45) and stopping motor S–M3 (lines 6–9). It will then be apparent whether condition 1 or condition 2 exists and the control system will react accordingly, or, in the event that both S–PC1 and S–PC4 should again see light simultaneously, then it will be apparent that no wander correction will be required and that all components will return to the their "normal" condition as described at the commencement of this discussion of the electrical system.

Under condition 8, contacts S–PC1A (LC) (line 43), S–PC2A (LC) (line 43), S–PC3A (LC) (line 43) and S–PC4A (LC) (line 43) will all be closed energizing motor relay S–MR4 (line 43). Contacts S–MR4*a* (line 10), S–MR4*b* (line 11) and S–MR4*c* (line 12) will close starting motor S–M3 (lines 6–9) rotating in the opposite direction from its direction of rotation under condition 7, and photocell units S–PC2 and S–PC3 will travel towards each other until one or both of them again see light or until limit switch S–LS7 is actuated when the distance between S–PC2 and S–PC3 equals the minimum fabric width which the let-off assembly 400 will tolerate, in which latter event contacts S–LS7B (line 43) and S–LS7A (line 17) will open shutting off motor S–M3 and failing the entire machine. Neither relay S–CR2 (line 46) nor relay S–CR3 (line 48) will become energized because contacts S–PC2B (DC) (line 46) and S–PC3C (DC) (line 47) will open. Contacts S–MR4*d* (line 45) and S–MR4*e* (line 49) will open doubly preventing, respectively, the energization of relay S–MR3 (line 45) and solenoids S–S1A (line 49) and S–S1B (line 50).

When, short of fail width, either S–PC2 or S–PC3 again sees dark, contact S–PC2A (LC) line 43) or S–PC3A (LC) (line 43) will open de-energizing relay S–MR4 (line 43) and shutting off motor S–M3 (lines 6–9), and the control system will be returned to normal, to condition 3, or to condition 4 as the case may be. If both S–PC2 and S–PC3 see dark simultaneously, the control system will be returned to the normal conditions first described, no wander correction being required.

It will be apparent to one skilled in the art that, while after each of the aforementioned error conditions has been corrected the control system will tend to return to normal, in the actual operation of the fabric let-off assembly 400, the aforementioned conditions may shift almost constantly without necessarily achieving a normal condition between the various adjustment conditions. For instance, the control system may go from "normal" to condition 1 to condition 5 to condition 1 to condition 7 to condition 4 to normal again. The sequence of operation of the control system in such a situation will be readily apparent, however, from FIG. 160 and from the foregoing discussion, to one skilled in the art.

Finally, in the event that any of the limit switches S–LS1, S–LS2 or S–LS3 or S–LS4 should become actuated by virtue of the fabric spreading assembly 405 not being able to spread the fabric 410 to the desired width, contacts S–LS1 (line 17), S–LS2 (line 17), S–LS3 (line 17) or S–LS4 (line 17) will open de-energizing relay S–CR1 (line 17) and failing the entire machine.

From the foregoing description it will be apparent that an apparatus in accordance with the invention have many advantages. The apparatus and method of the present invention are operative as a fully integrated and automatic machine and method capable of making tire carcasses of uniform quality at a high production rate. While the apparatus has been described in connection with the manufacture of two-ply carcasses, it will be obvious to those skilled in the art that tire carcasses of a different number of plies, for example, four plies, can be readily constructed by apparatus in accordance with the invention by utilizing additional units such as fabric let-off units, winding frames, cutters, and transfer apparatus operatively synchronized and controlled in a manner similar to corresponding units described in the specification. The winding frames support and drive the drums at accurately synchronized speeds in cooperation with fabric let-off units which accurately supply fabric to the drums on the winding frames, with controlled overlap of adjacent windings and without wrinkling the fabric.

The apparatus of the invention may also be used advantageously to manufacture tubular bands such as, for example, two-ply carcass structures having no beads and carcass structures in which one of the plies is a liner for tubeless tires.

Another advantage of the apparatus is the utilization of fabric having longitudinal cords therein, thereby avoiding the necessity of bias-cutting and splicing fabric. The angle of wrap of the fabric can be readily altered and the width of the fabric may be altered as desired to control the cord angle of the carcass. During such changes the point of contact of each drive wheel with the ply-bearing drum remains the same because the axis of rotation of each adjustable frame supporting the drive wheel is normal to and intersects the axis of rotation of the corresponding drive wheel and is normal to and intersects the longitudinal axis of the drums.

The terms "fabric" and "sheet material" are used interchangeably herein.

While there have been described what are at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. In an apparatus for continuously sensing whether a continuous sheet of fabric of varying width moving therethrough is centered about a predetermined point in said apparatus, the combination comprising: a light-reflecting roller, positioned perpendicular to the path of travel of said fabric, over which said fabric may be passed; two spaced mounting means each displaceable in the direction of the axis of said roller; each of said mounting means being provided with a pair of light-sensitive devices so mounted thereon as to be sensitive, respectively, to light reflected from a pair of closely spaced reflection points on said roller, each of said pairs of reflection points being spaced in the direction of the axis of said roller, and said pairs of reflection points being equidistant from a predetermined longitudinal point of said roller; means responsive to light reflected to said light-sensitive devices for driving said mounting means simultaneously in opposite directions with respect to the axis of said roller so that said pairs of reflection points may always remain equidistant from said predetermined longitudinal point of said roller.

2. The combination in accordance with claim 1 in which said driving means is effective to move said mounting means closer together when all of said light-sensitive devices are sensitized by reflective light and to move said mounting means further apart when none of said light-sensitive devices are sensitized by reflective light.

3. Apparatus for maintaining a continuous fabric sheet of varying width passing over a light-reflecting roller in a centered condition with respect to said roller, said roller rotating on an axis perpendicular to the path of travel of said fabric, the combination comprising: a source of fabric supply for said roller, said source being movable parallel to the axis of said roller; two spaced sensing means, each displaceable parallel to the axis of said roller, for sensing and signaling independently, with respect to two sensing zones on said roller located on either side of the longitudinal midpoint of said roller and equidistant therefrom, whether said fabric sheet covers all, part of or none of said sensing zone; driving means, responsive to a signal from said sensing means that both sensing zones are completely covered, for moving said sensing means apart while keeping said sensing means equidistant from said midpoint; said driving means also including means, responsive to a signal from said sensing means that both sensing means are completely uncovered, for moving said sensing means together while keeping said sensing means equidistant from said midpoint; and means, responsive to a signal from said sensing means that only one sensing zone is partially covered, for moving said fabric supply source relative to said roller to center said fabric sheet.

4. Apparatus for maintaining a continuous fabric sheet of varying width passing over a light-reflecting roller in a centered condition with respect to said roller, said roller rotating on an axis perpendicular to the path of travel of said fabric, the combination comprising: a source of fabric supply for said roller, said source being movable parallel to the axis of said roller; elongated support means positioned parallel to said roller; two pairs of photoelectric cells displaceable along said support means, said pairs being spaced from each other and located on either side of the longitudinal midpoint of said roller, and each said pair of photoelectric cells being sensitive to light reflected from a pair of reflection points on said roller closely spaced in the direction of the axis of said roller and being capable of signaling independently whether said fabric sheet covers both, only one or neither of each said respective pair of reflection points; driving means, responsive to a signal from both pairs of photoelectric cells that all reflection points are completely covered, for moving said pairs of photoelectric cells apart while keeping said photoelectric cells equidistant from said midpoint; said driving means also being responsive to a signal from both pairs of photoelectric cells that no reflection points are covered, for moving said pairs of photoelectric cells together while keeping said photoelectric cells equidistant from said midpoint; and means, responsive to a signal from either pair, but not both pairs, of photoelectric cells that only one reflection point is covered, for moving said fabric supply source relative to said roller to center said fabric sheet.

References Cited

UNITED STATES PATENTS

| 2,203,706 | 6/1940 | Stockbarger | 226—20 |
| 2,208,420 | 7/1940 | Gulliksen | 226—20 |
| 2,490,085 | 12/1949 | Nordquist et al. | 271—49 |
| 2,528,106 | 10/1950 | Albrecht | 271—49 |
| 2,735,630 | 2/1956 | Ziebolz | 156—351 X |
| 2,840,721 | 6/1958 | Frommer | 242—57.1 X |
| 3,232,547 | 2/1966 | Thiede et al. | 226—20 X |
| 3,247,354 | 4/1966 | Mallett et al. | 226—20 X |

FOREIGN PATENTS 410,859  5/1934  Great Britain.

EARL M. BERGERT, *Primary Examiner.*

H. ANSHER, *Assistant Examiner.*